(12) United States Patent
Horvitz et al.

(10) Patent No.: US 6,931,384 B1
(45) Date of Patent: Aug. 16, 2005

(54) SYSTEM AND METHOD PROVIDING UTILITY-BASED DECISION MAKING ABOUT CLARIFICATION DIALOG GIVEN COMMUNICATIVE UNCERTAINTY

(75) Inventors: Eric J. Horvitz, Kirkland, WA (US); Timothy S. Paek, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 762 days.

(21) Appl. No.: 09/832,274

(22) Filed: Apr. 10, 2001

Related U.S. Application Data

(63) Continuation-in-part of application No. 09/326,043, filed on Jun. 4, 1999, now Pat. No. 6,490,698.
(60) Provisional application No. 60/240,613, filed on Oct. 16, 2000.

(51) Int. Cl.$^7$ .............................................. G06F 15/18
(52) U.S. Cl. ....................................................... 706/45
(58) Field of Search ........................................... 706/45

(56) References Cited

U.S. PATENT DOCUMENTS

| | | | | |
|---|---|---|---|---|
| 5,327,437 A | * | 7/1994 | Balzer | 714/736 |
| 5,564,005 A | * | 10/1996 | Weber et al. | 345/863 |
| 6,351,698 B1 | * | 2/2002 | Kubota et al. | 701/51 |
| 6,606,744 B1 | * | 8/2003 | Mikurak | 717/174 |

OTHER PUBLICATIONS

Peter Kubat, Estimation of Reliability for Communication/Computer Networks–Simulation/Analytic Approach (IEEE, 1989).*

Vassiliou, M.S., et al., "Integrated Multimodal Human–Computer Interface and Augmented Reality for Interactive Display Applications", Proceedings of the SPIE—The International Society for Optical Engineering, vol. 4022, 2000, p. 106–115.

Sawhney, N., et al., "Nomadic Radio: Speech and Audio Interaction for Contextual Messaging in Nomadic Environments", ACM Transactions on Computer–Human Interaction, vol. 7, No. 3, Sep. 2000, p. 353–383.

Peng, FC, et al.; "Bayesian Interference in Mixtures–of–Experts and Hierarchical Mixtures–of–Experts Models with an Application to speech Recognition", Journal of the American Statistical Association, V.91, No. 435, 1996, p 953–960.

* cited by examiner

Primary Examiner—Anthony Knight
Assistant Examiner—Michael B. Holmes
(74) Attorney, Agent, or Firm—Amin & Turocy, LLP

(57) ABSTRACT

An interactive communications system is provided in accordance with the present invention. The system includes a component for analyzing sequential communications including speech, gestures and other modalities related to an underlying communicative intention. The component concurrently employs at least two of the communications in determining an action to facilitate achieving the intention.

27 Claims, 9 Drawing Sheets

SYSTEM AND METHOD PROVIDING UTILITY-BASED DECISION MAKING ABOUT CLARIFICATION DIALOG GIVEN COMMUNICATIVE UNCERTAINTY

REFERENCE TO RELATED APPLICATIONS

This application claims the benefit of U.S. Provisional Patent Application Ser. No. 60/240,613, which was filed Oct. 16, 2000, entitled SYSTEM AND METHOD PROVIDING UTILITY-BASED DECISION MAKING GIVEN COMMUNICATIVE UNCERTAINTY, and this application is a continuation-in-part of application Ser. No. 09/326,043, filed Jun. 4, 1999 now U.S. Pat. No. 6,490,698, entitled A MULTI-LEVEL DECISION-ANALYTIC APPROACH TO FAILURE AND REPAIR IN HUMAN-COMPUTER INTERACTIONS.

TECHNICAL FIELD

The present invention relates generally to computer systems, and more particularly to a system and method for improving man-machine command and control situations via utility-based determinations over time given uncertainties about a user's intentions and utterances.

BACKGROUND OF THE INVENTION

Computer systems have forever changed modern society and industry. In recent times, technological innovations relating to computers have increasingly become intertwined with daily activities. For example, it has become commonplace for humans and machines—such as computers, to interact and/or communicate in order to affect real-world outcomes. Many of these interactions involve transactions wherein computers are directed by humans via some form of communications input such as from keyboards, speech, and/or vision sensors. As an example, it is common to interact over the telephone with a voice-activated system to conduct transactions associated with airline travel, banking, and shopping to name but a few applications. Other examples involve more sophisticated applications such as in control environments wherein operators direct computer-controlled systems via spoken and/or other human commands. Unfortunately, public enthusiasm for interacting with automated systems, such as provided by automated speech recognition systems has been tempered by the common experience of frustrating and costly recognition of errors associated with these systems.

A common frustration with human-machine interactions relates to machines making improper choices based upon uncertain/ambiguous communications directed to the machine. These uncertainties may involve differences in audibility (e.g., background noise, input decibel level), speech patterns, dialects, and word choices, for example. Many conventional systems fail to adequately account for uncertainty, however. These systems will often erroneously conduct transactions and/or affect real world outcomes with little or no consideration regarding the costs associated with making a mistake. These systems also generally fail to assess internal states of uncertainty before making their decisions. Another problem associated with conventional systems is that utterances (e.g., discrete commands directed over time at computer) are generally treated as independent events wherein previous utterances are generally unaccounted for when determining a user's current command/instruction. This also may lead to increased misunderstanding and thus frustration between humans and computers.

In view of the above problems associated with conventional speech and/or other communications recognition systems, there is an unsolved need for a system and/or methodology to facilitate improved decision-making by computers based upon ambiguous and/or uncertain human command utterances and environments.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to facilitate improved communications between humans and machines such as computers, and provide improved control of actions as a result of the communications. This may be achieved by leveraging knowledge about probabilistic relationships between an output of a recognizer (e.g., computer interpreting utterances), and inferred intentions of speakers and/or other communicators, as well as a utility-based consideration of the costs and benefits of alternative actions taken under uncertainty. One or more layers of reflection are provided to facilitate context-sensitive decision-making about an intended target of an utterance, the intentions of the communicator, and thus, the optimal actions to execute based upon utility-directed principles. These actions may include real-world actions such as enabling/disabling an output for example, or may involve dialog actions wherein a user is directed to further clarify his or her intentions based upon probabilistic determinations of uncertainty.

More particularly, the present invention couples utility-based policies for dialog with ongoing Bayesian fusion of evidence associated with utterances that are directed by communicators. The evidence may be obtained from multiple utterances during interactions between humans and machines, for example. Evidence about utterances is gathered over time to enable decisions about optimal dialog strategies and/or real-world actions given uncertainties about the user's intentions and the cost and benefits of outcomes related thereto.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to communications recognition and decision-making under uncertainty. A system and methodology is provided to identify uncertainties and to select actions with the highest expected utility given uncertainty about the intentions associated with an utterance. Bayesian graphical decision models, referred to as influence diagrams, and dynamic Bayesian networks may be employed to infer the intentions and to determine the expected utility given the uncertainties. The system may refine probability of a user's intention by fusing information from multiple utterances provided in a recognition session over time. The Bayesian fusion of utterances over time, coupled with utility-directed actions, enables a command and control system to refine the probability of a user's intention by overlaying information from time-adjacent human responses.

Figure 1:
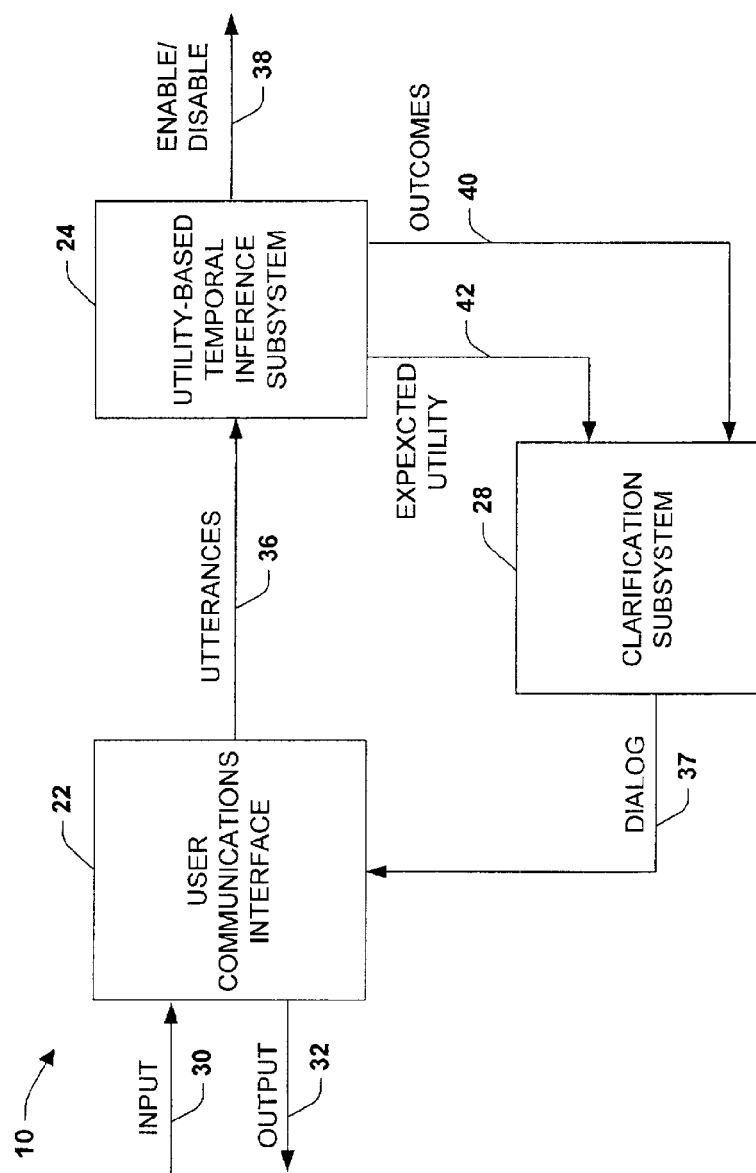
FIG. 1 is a schematic block diagram illustrating a command recognition and control system in accordance with an aspect of the present invention.

Referring initially to FIG. 1, a command recognition and control system 10 is illustrated in accordance with an aspect of the present invention. The system 10 includes a user communications interface 20, a utility-based temporal inference subsystem 24, and a clarification subsystem 28. The communications interface 20 receives user command inputs 30 and provides output/feedback 32 to the user. As an example, the communications interface 20 may be substantially any system for processing input/output communications with the user. For example, the interface 20 may include a microphone for speech input and a speaker and/or display for dialog output. Similarly, a keyboard may be utilized for input with associated computer display for output. It is to be appreciated that other systems may be employed such as vision systems wherein vision sensors such as cameras or other devices visually monitors/displays user input/output. It is noted that substantially any number of input devices may be added to the system in order to infer more accurately via more evidence of the user's intentions.

Upon receiving user input 20, the interface 20 provides an output 36 in the form of captured utterances 36 (e.g., yes, no, stop, start) to the utility-based temporal inference subsystem 24, hereinafter referred to as the utility system 24. It is to be appreciated that the term "utterances" applies to substantially any form of captured/digitized communications (e.g., typed utterances, speech utterances, visual utterances such as sign language) that are directed by the user over time. The utility system 24 analyzes the utterances 36 over time in discrete time-slices such as conversational turns, and probabilistically determines whether to initiate a dialog 37 with the user or to engage or disengage in real-world events/actions by enabling or disabling a system output flag 38. The utility system 24, which may include other evidence inputs (not shown) such as reliability indicators, makes decisions about whether to initiate clarification with the user based upon assessments of uncertainty about inferred user intentions.

Assessments may be determined by probabilistically analyzing the costs and benefits of a plurality of possible outcomes 40 (e.g., domain-level action such as engage output, or dialog action such as inquire more information from user, troubleshoot). As a result of the assessment, an expected utility factor 42 is generated assigned to each of the plurality outcomes 40 given the uncertainties associated with the utterances 36. In a mathematically equivalent form, a confidence threshold may be established by the utility system 24 wherein if the expected utility is below a predetermined threshold (e.g., expected utility below 0.9 to engage output), the utility system 24 initiates more dialog 37 with the user via the clarification subsystem 28 to increase confidence (e.g., reduce uncertainty associated with the utterances 36). Based upon the expected utility factor 42 assigned to each of the possible outcomes 40, the clarification subsystem 28 determines which outcome 40 has the highest expected utility 42 and provides a predetermined dialog 37 associated with the determined outcome 40. As an example, if the most probable outcome 40 is to inquire for more information, the dialog 37 which may be directed to the user may be "Can you repeat that". It is to be appreciated that a plurality of outcomes 40 with a plurality of associated dialogs may be defined for the system 10 as will be described in more detail below.

Figure 2:
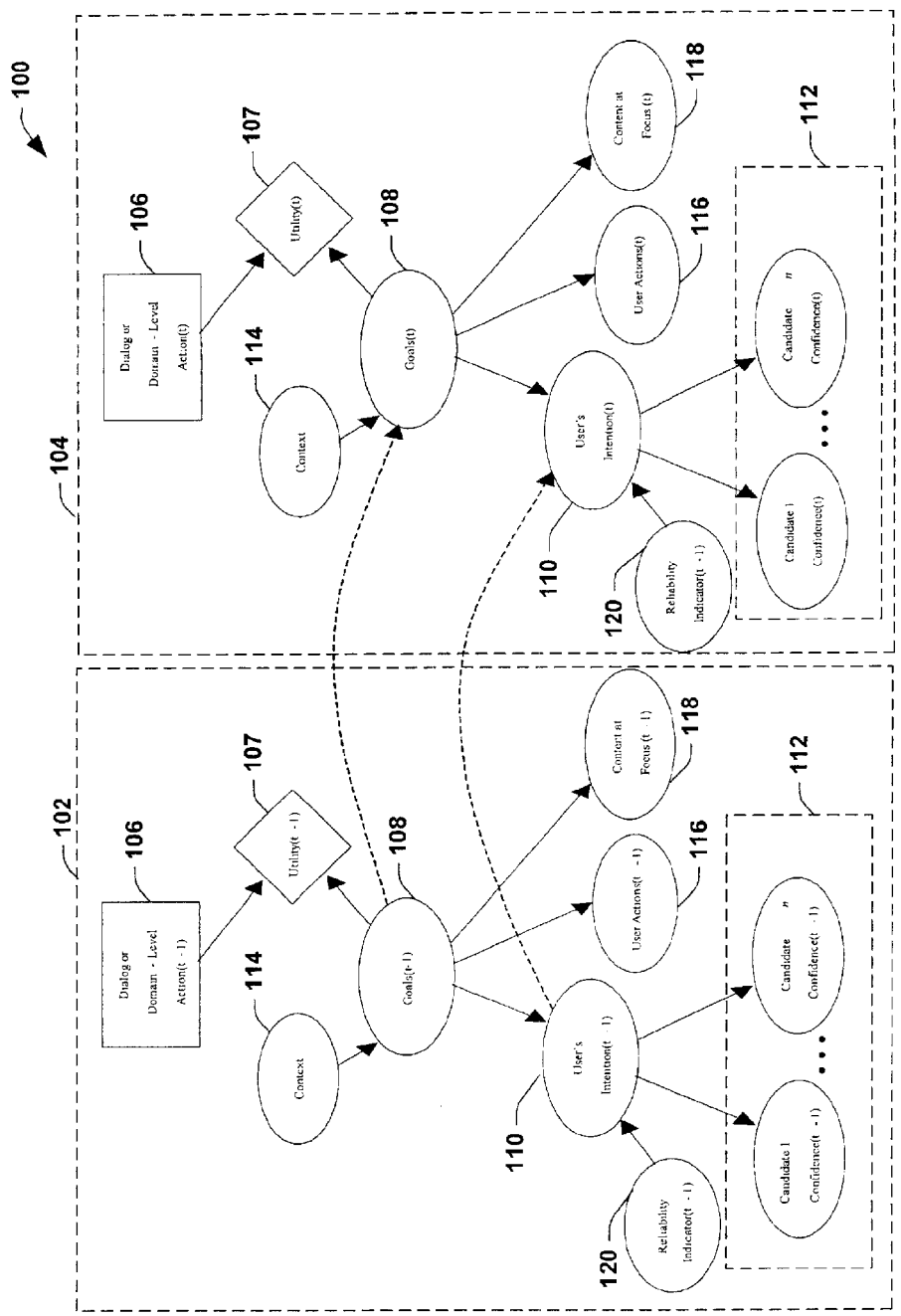
FIG. 2 is a schematic block diagram illustrating a temporal Bayesian network model in accordance with an aspect of the present invention.

Referring now to FIG. 2, a utility-based probabilistic temporal model 100 is illustrated over multiple turns (e.g., time-slices) 102 and 104 of a dialog session in accordance with the present invention. The model represents a Bayesian network, wherein arcs (e.g., arrows) represent influence upon variables in the direction of the arcs. By traversing in a reverse/opposite direction of the arcs, higher-level variables may be probabilistically inferred as is well understood. For example, some of the higher-level variables may include user intentions, goals, and actions. It is to be appreciated that although two exemplary turns 102 and 104 are depicted in FIG. 2, that the present invention may be applied to a plurality of turns over time.

The model 100 captures variables under consideration at a specific turn in an interaction with the system 10 described in FIG. 1. An oval represents a random variable and an arc captures a probabilistic dependency among variables. A decision (square node) 106 and value variable (diamond node) 107 in each time-slice, in conjunction with the dynamic Bayesian network model 100, encompass a local decision problem that is employed to identify local actions associated with the largest expected utility 107, based on the inferred probability over a user's intentions. For example, a speaker can have 1 of N goals 108 and the system can take 1 of M possible actions 106, wherein N and M are integers, respectively. Thus, N*M states are captured in the utility node 107, wherein the highest expected utility is determined given the probabilistic uncertainties associated with variables lower in the model 100. The model 100 is employed to reason about a user's communicated intentions that is depicted as a variable 110 in the model. The variable 110 includes states representing the intention associated with various utterances such as unrecognized acoustical information, for example, detected by the system 10.

For example, the intentions 110 may include, acknowledgment (e.g., user's spoken command was intended to communicate, "yes do it"), negation (e.g., "no, don't do that"), reflection (e.g., responses like "hmm," "uh,", etc. associated with a user's reflection about the service), unrecognized signal (e.g., system has heard an unrecognized noise or stream of words), and no signal (e.g., nothing is heard). A set of candidate utterances 1 through N, N being and integer, 112, the user may generate for each intention 110, may include a plurality of responses capturing potential mannerisms in which people respond. The responses may include an acknowledgment (e.g., "yes," "okay," "sure," "yeah," "go ahead," "right," "allright,", visually determined thumbs-up etc.), rejection (e.g., "no," "go away," "not now," "later," "no way," "get out of here," "nah," "nope,", visually determined thumbs-down, etc.), and an explicit or implicit request for more time to deliberate about the desire for a service (e.g., "wait," "um," "hmmm," "uh,", visually determined hand on chin, wrinkle in forehead etc.).

The arcs in the model 100 indicate that the user's goals 108 influence a user's communicated intentions 110 which in turn influence the likelihood that the system 10 user interface will report different utterances. A variable labeled context, 114 captures information that may be provided by an external user modeling system (not shown). For example, such an external system may include a facility for assigning likelihoods to the goals 108. As captured in the decision model 100, the user's goals 108 influence user actions 116 that may be observed, including a content 118 that a user is focusing on and/or creating. A variable 120 captures potentially observed information about system conditions that can influence the overall reliability of communications recognition, including levels of background noise, for example.

Conditional probabilities may be encoded in the model 100, including those representing the likelihood of receiving different classes of response with specific values of confidence (e.g., predetermined thresholds), given the intention represented by the user's actual utterance. At run-time, the model 100 observes probabilistic evidence reported by the user interface (e.g., speech engine), such as recognized candidates 112 and confidences, and user activity 116 and infer the likelihood over states of variables higher up in the model 100 that are not observed directly, such as the users intentions 108. A probability distribution over a user's intentions 108 is employed to compute a dialog action or real-world action that has the highest expected utility at each turn 102 and 104.

To evaluate the utterances, a list of candidate commands and their confidence scores are retrieved by the system 10. A probability distribution is inferred over the classes of response represented by a processed communications input directed by the user and a local decision 106 with maximum expected utility 107 is identified. In one version of the system 10, possible actions 106 may include but are not limited to exemplary actions listed in the following table:

Table 1

Execute the service being offered/enable real-world event
Ask user to repeat an utterance
Note a recognition of a user's hesitation and try again
Note the hearing of a noise and inquire
Try to get the user's attention
Apologize for the interruption and forego the service
Engage in troubleshooting about the overall dialog The model 100 may be constructed by assessing the utility of different outcomes in the space of outcomes defined by the cross product of the classes of response under consideration and the actions listed above.

Figure 3:
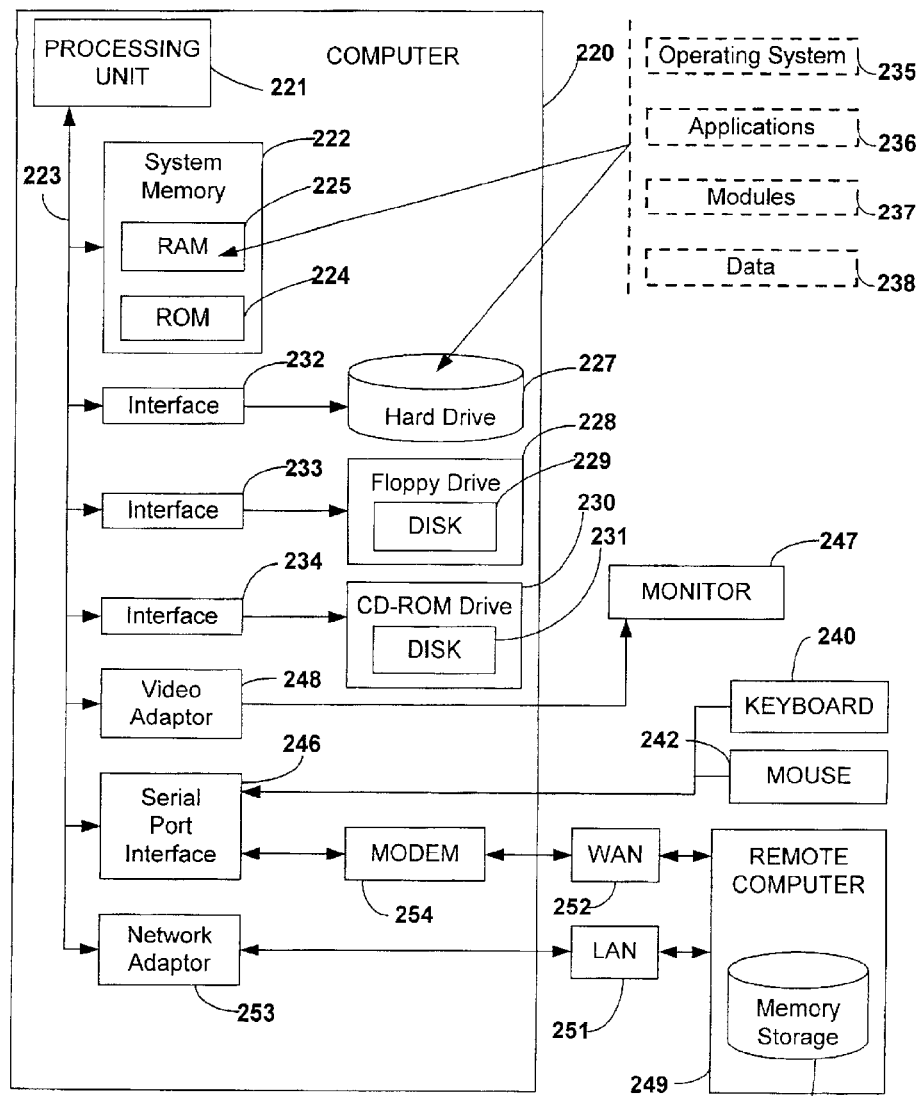
FIG. 3 is a schematic block diagram illustrating a suitable computing environment in accordance with an aspect of the present invention.

In order to provide a context for the various aspects of the invention, FIG. 3 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 3, an exemplary system for implementing the various aspects of the invention includes a computer 220, including a processing unit 221, a system memory 222, and a system bus 223 that couples various system components including the system memory to the processing unit 221. The processing unit 221 may be substantially any of various commercially available processors. Dual microprocessors and other multi-processor architectures also can be used as the processing unit 221.

The system bus may be any of several types of bus structure including a memory bus or memory controller, a peripheral bus, and a local bus using a variety of commercially available bus architectures. The system memory may include read only memory (ROM) 224 and random access memory (RAM) 225. A basic input/output system (BIOS), containing the basic routines that help to transfer information between elements within the computer 220, such as during start-up, is stored in ROM 224.

The computer 220 further includes a hard disk drive 227, a magnetic disk drive 228, e.g., to read from or write to a removable disk 229, and an optical disk drive 230, e.g., for reading from or writing to a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 225, including an operating system 235, one or more application programs 236, other program modules 237, and program data 238. The operating system 235 in the illustrated computer may be substantially any commercially available operating system.

A user may enter commands and information into the computer 220 through a keyboard 240 and a pointing device, such as a mouse 242. Other input devices (not shown) may include a microphone, a joystick, a game pad, a satellite dish, a scanner, or the like. These and other input devices are often connected to the processing unit 221 through a serial port interface 246 that is coupled to the system bus, but may be connected by other interfaces, such as a parallel port, a game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The computer 220 may operate in a networked environment using logical connections to one or more remote computers, such as a remote computer 249. The remote computer 249 may be a workstation, a server computer, a router, a peer device or other common network node, and typically includes many or all of the elements described relative to the computer 220, although only a memory storage device 250 is illustrated in FIG. 3. The logical connections depicted in FIG. 3 may include a local area network (LAN) 251 and a wide area network (WAN) 252. Such networking environments are commonplace in offices, enterprise-wide computer networks, Intranets and the Internet.

When employed in a LAN networking environment, the computer 220 may be connected to the local network 251 through a network interface or adapter 253. When utilized in a WAN networking environment, the computer 220 generally may include a modem 254, and/or is connected to a communications server on the LAN, and/or has other means for establishing communications over the wide area network 252, such as the Internet. The modem 254, which may be internal or external, may be connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 220, unless otherwise indicated. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations wherein such data bits are maintained are physical locations that have particular electrical, magnetic, or optical properties corresponding to the data bits.

Referring now to FIGS. 4 through 7, an aspect of the present invention is illustrated according to the concepts described above in relation to FIGS. 1 and 2. For example, the system 10 described above can provide a base-level automated speech recognition (ASR) command and control system with additional flexibility by evaluating listening and reacting in a manner consistent with both current uncertainty about the intentions associated with one or more utterances and preferences about outcomes. In typical situations of uncertainty, the system 10 makes decisions in accordance with its understanding of the expected consequences of alternate actions. The experience of interacting with the system in noisy environments—or at a relatively long distance away from a microphone, for example—appears to give users the impression of communicating with a person who is having difficulty hearing. For example, a user can utter different words for acknowledging or accepting a service and can expect the system to have considered the entire recent history of interaction, rather than treating each utterance as an independent event.

Figure 4:
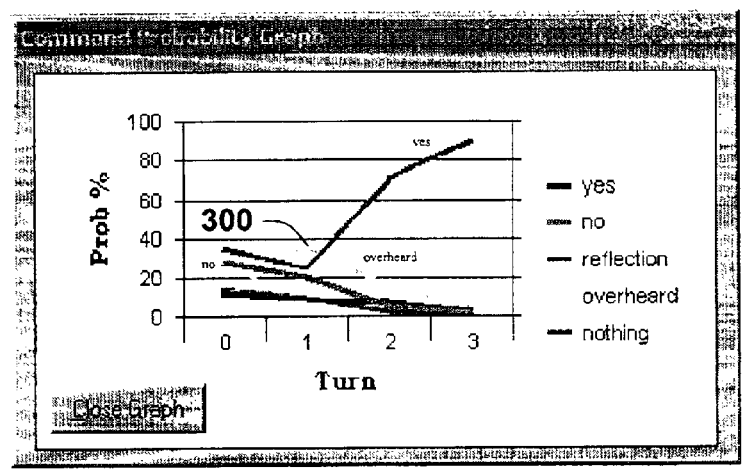
FIG. 4 is a graph illustrating command probabilities in accordance with an aspect of the present invention.
Figure 5:
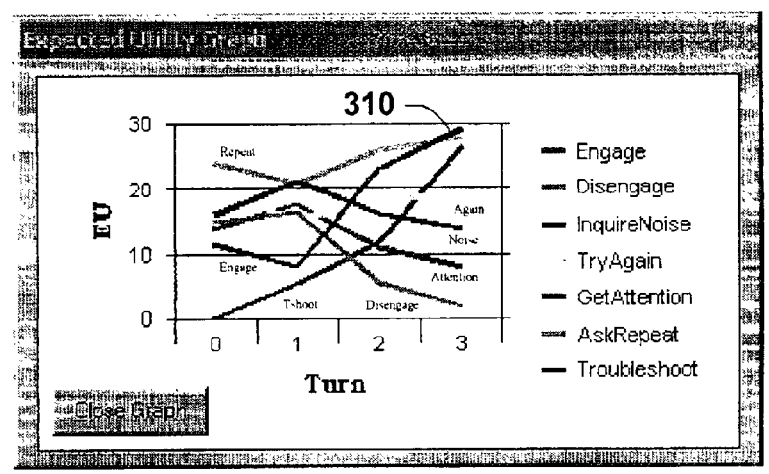
FIG. 5 is a graph illustrating expected utility in accordance with an aspect of the present invention.

FIGS. 4 and 5 display graphs of the probabilities and expected utilities inferred over time from a sample interaction. For this interaction, the system 10 was exposed to an ongoing background conversation that was paused briefly with a response of "yeah." The prior probabilities of different intentions, shown in turn 0, are updated at turn 1. The most likely state of affairs at this time is overheard depicted at reference numeral 300. The action with the maximum expected utility is the sharing of the inferred inference via a confused agent (depicted in FIG. 7) demonstrating its thinking, " . . . Was that meant for me?" appearing in a thought cloud, for example. In the next turn 2, the user provides a muffled "yes." The system recognizes "yes" with low confidence and a "yeah" with medium confidence, and updates substantially all of its probabilities and expected utility calculations. Now, the most likely intention is "yes, perform the service." However, given the utility model, the action with the highest expected utility is to ask the user to repeat the response. Following the receipt of a clarifying "sure," the system 10 updates the probabilities and utilities of alternate actions and performs the service, as displayed in turn 3 of the session captured in FIG. 5 at reference 310.

Figure 6:
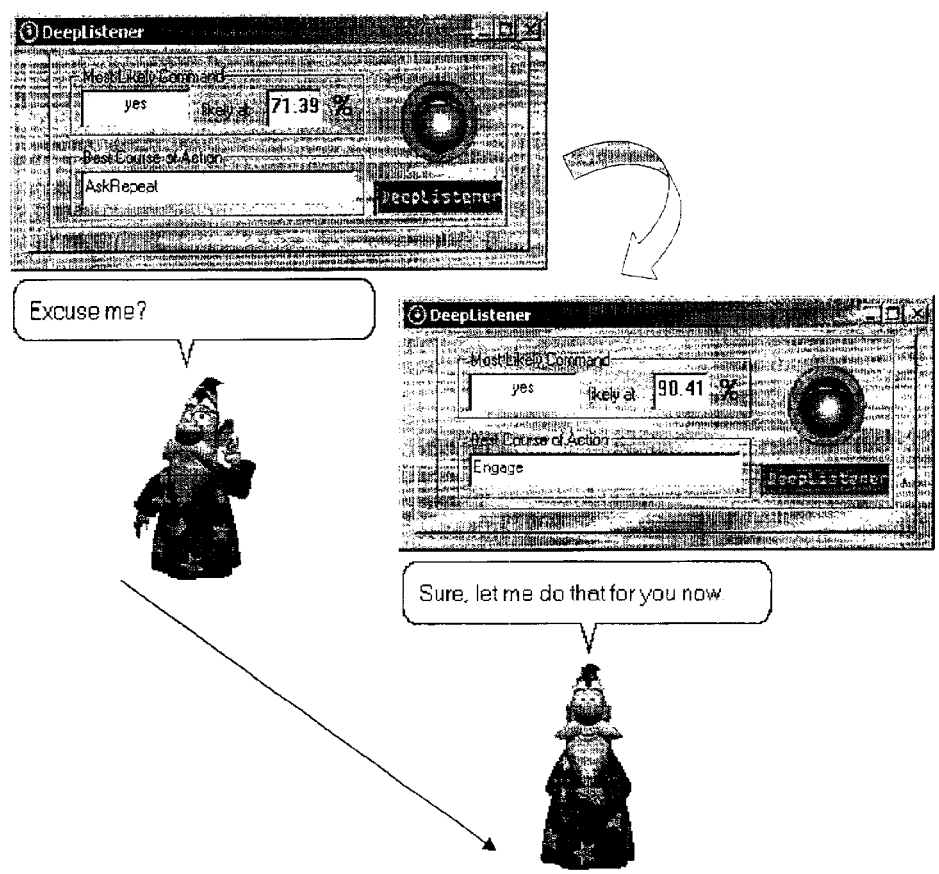
FIG. 6 is display illustrating an exemplary command recognition system and display in accordance with an aspect of the present invention.
Figure 7:
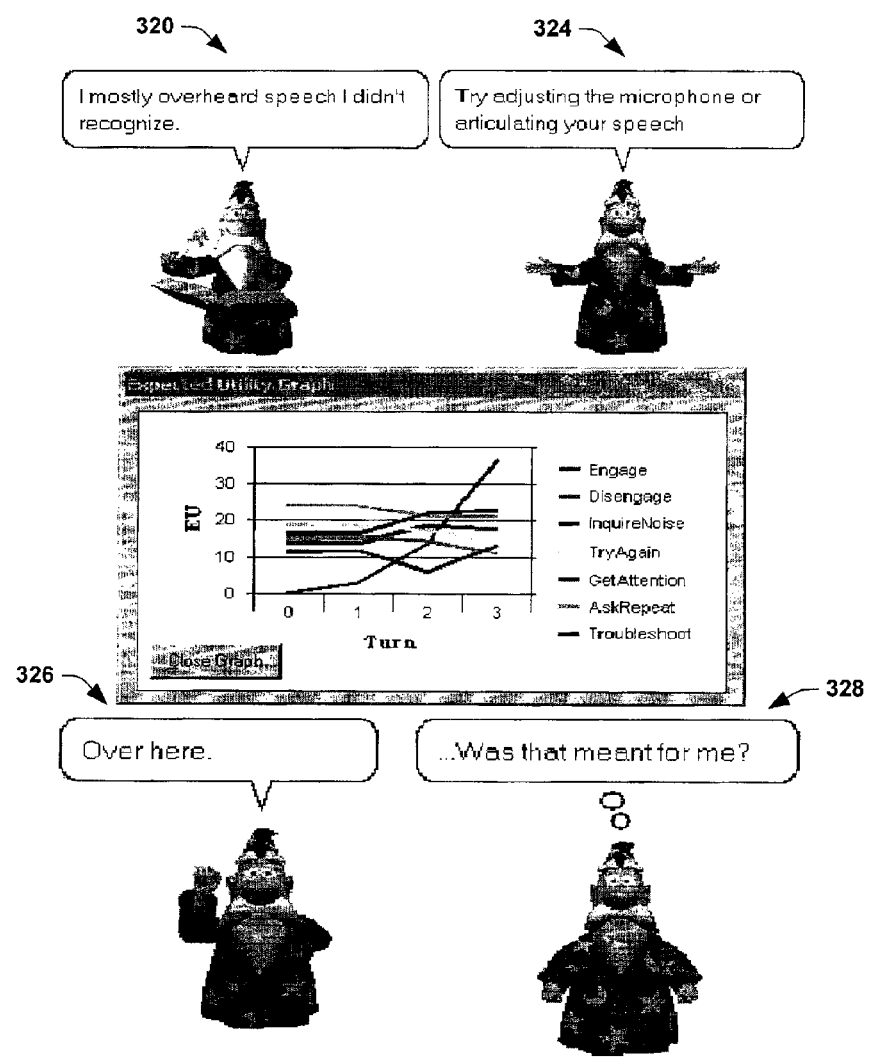
FIG. 7 is a graph and display illustrating command recognition and expected utility in accordance with an aspect of the present invention.

FIG. 6 displays the user experience at turns 2 and 3 of the interaction described above. FIG. 7 displays a session wherein the expected value of troubleshooting dominates the other actions at turn 3. In attempting to assist with troubleshooting, the system provides a multi-step report depicted at reference numerals 320, 324, summarizing the history of the system's probabilistic inferences about the user's intentions during the session. It is to be appreciated that more or less troubleshooting steps may be provided in conjunction with or in lieu of the exemplary steps illustrated at 320 and 324. In the lower portion of FIG. 7, the system's behavior is displayed in cases where the system decides that it should acquire the user's attention 326 and the system believes it is overhearing utterances directed elsewhere 328.

The present invention can be employed as a development tool that can be utilized for multiple command and control domains. A set of preference assessment tools enable system builders or end users to assess utilities of real-world domain actions given each of the user's potential intentions. Utilizing an ActiveX interface for example, an external system (e.g., planner, scheduler, message router, help and control systems) can supply probabilities about a user's goals based on the system's respective analysis or observations. The interface can enable an external user model to influence the prior probabilities of different user goals in a dynamic manner.

The present invention enables coupling spoken command and control systems with temporal probabilistic decision models that consider the costs and benefits of alternate actions. This approach can infer key probabilities by pooling information gathered during one or more adjacent attempts to communicate with a system, and computing the expected utility of alternate real world and/or dialog actions. One particular aspect of the present invention was described above for guiding clarification dialog in a selective, context-sensitive manner, to fundamentally change the qualitative experience of interacting with spoken language systems.

Figure 8:
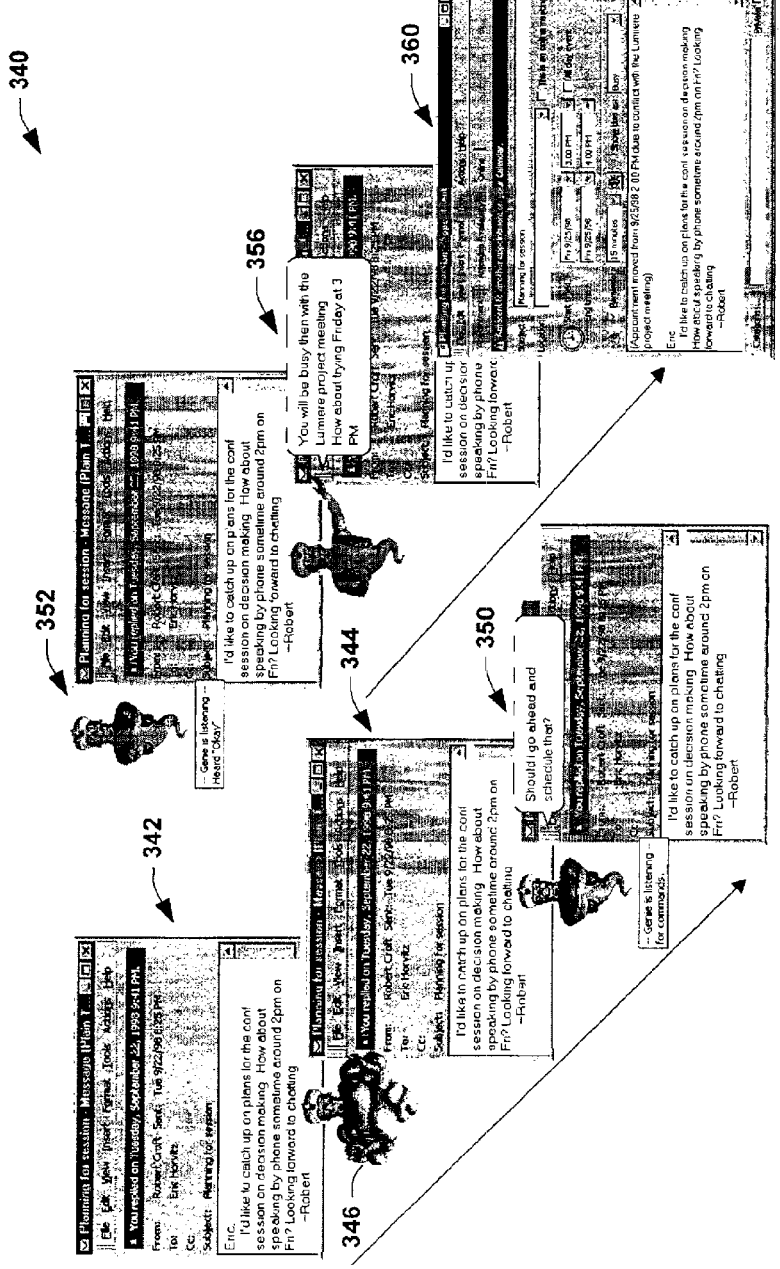
FIG. 8 is a display illustrating an alternative interface and command recognition system in accordance with an aspect of the present invention.

Referring now to FIG. 8, an alternative command recognition and control system is illustrated in accordance with the present invention. For example, a series of display outputs 340 are depicted in FIG. 8 that can be provided to interact and support such activities as synchronization of contacts, appointments and tasks from such systems as an e-mail, scheduling, calendaring, and planning service, for example. As an example, an e-mail is depicted as arriving at 342. At 344 an animated agent 346 (e.g., genie, wizard, helper) appears (e.g., appearance triggered from e-mail at 346). At 350, the agent 346 inquires whether to schedule the event referred to in the e-mail 342. At 352, the agent 346 is given a verbal command, such as O.K. in this example. It is noted that a plurality of positive, negative and/or other commands/gestures (e.g., pause indicating uncertainty) can be given/resolved. For example, if "No" was spoken at 352, the agent 346 can disappear. At 356, the agent 346 notifies the user that their calendar indicates a conflict for the requested meeting and suggests an alternative time. At 360, the agent can automatically schedule a meeting and reply to sender based upon the users affirmative response at 356.

Figure 9:
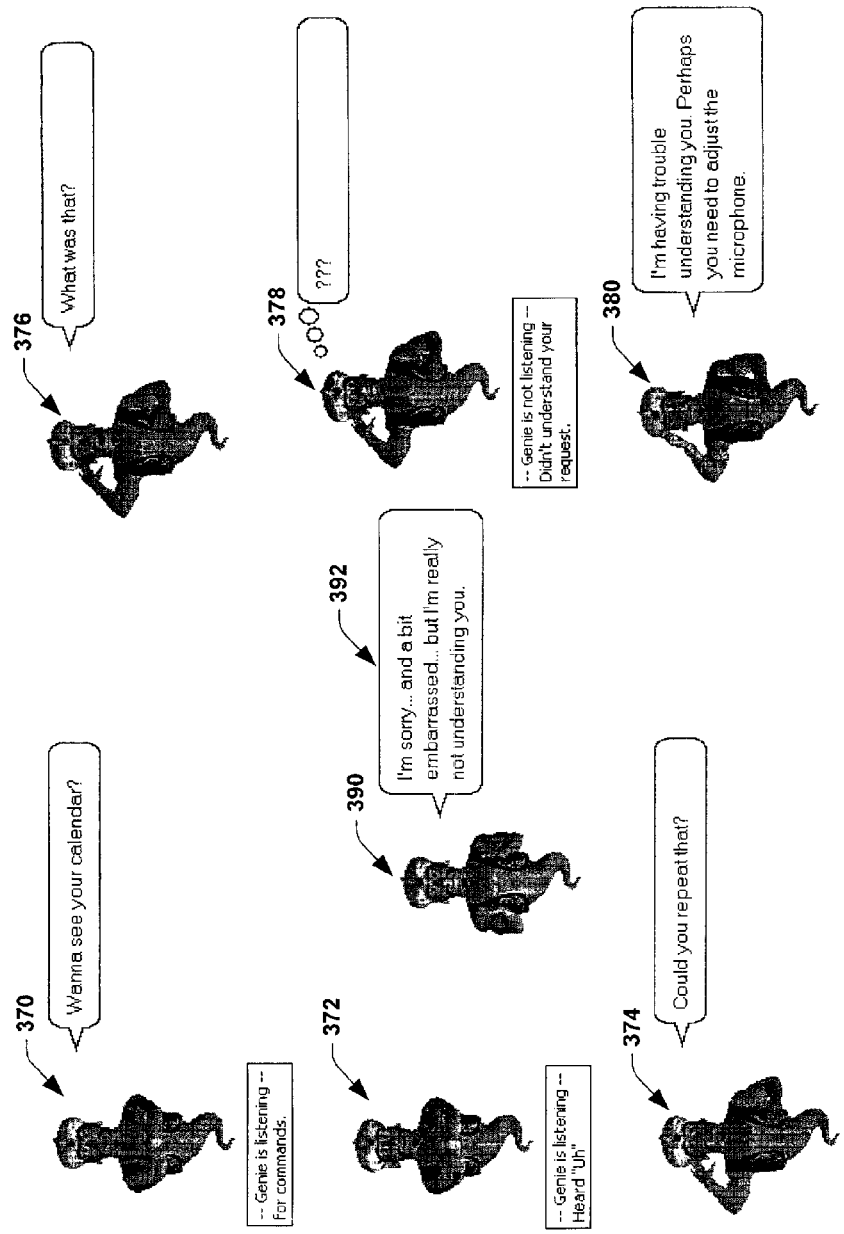
FIG. 9 is a display illustrating an alternative system gestures and output in accordance with an aspect of the present invention.

Turning to FIG. 9, alternative agent gestures/expressions are illustrated in accordance with an aspect of the present invention. It is noted that the gestures and/or expressions illustrated in FIG. 9 are exemplary in nature. It is to be appreciated that a plurality of other gestures and/or expressions can be provided in accordance with the present invention. For example, an agent 370 can appear when a calendar event has been scheduled with an expression such as "Wanna see your calendar". At 372, the agent is depicted as listening for a response. At 374, the agent expresses some uncertainty by asking "Can you repeat that". Similar expressions of uncertainty are illustrated at 376 and 378. At 380, the agent acknowledges some difficulty in understanding, and offers troubleshooting advice. At 390, if the agent is still having trouble understanding the user, another expression such as depicted at 392 can be provided.

Figure 10:
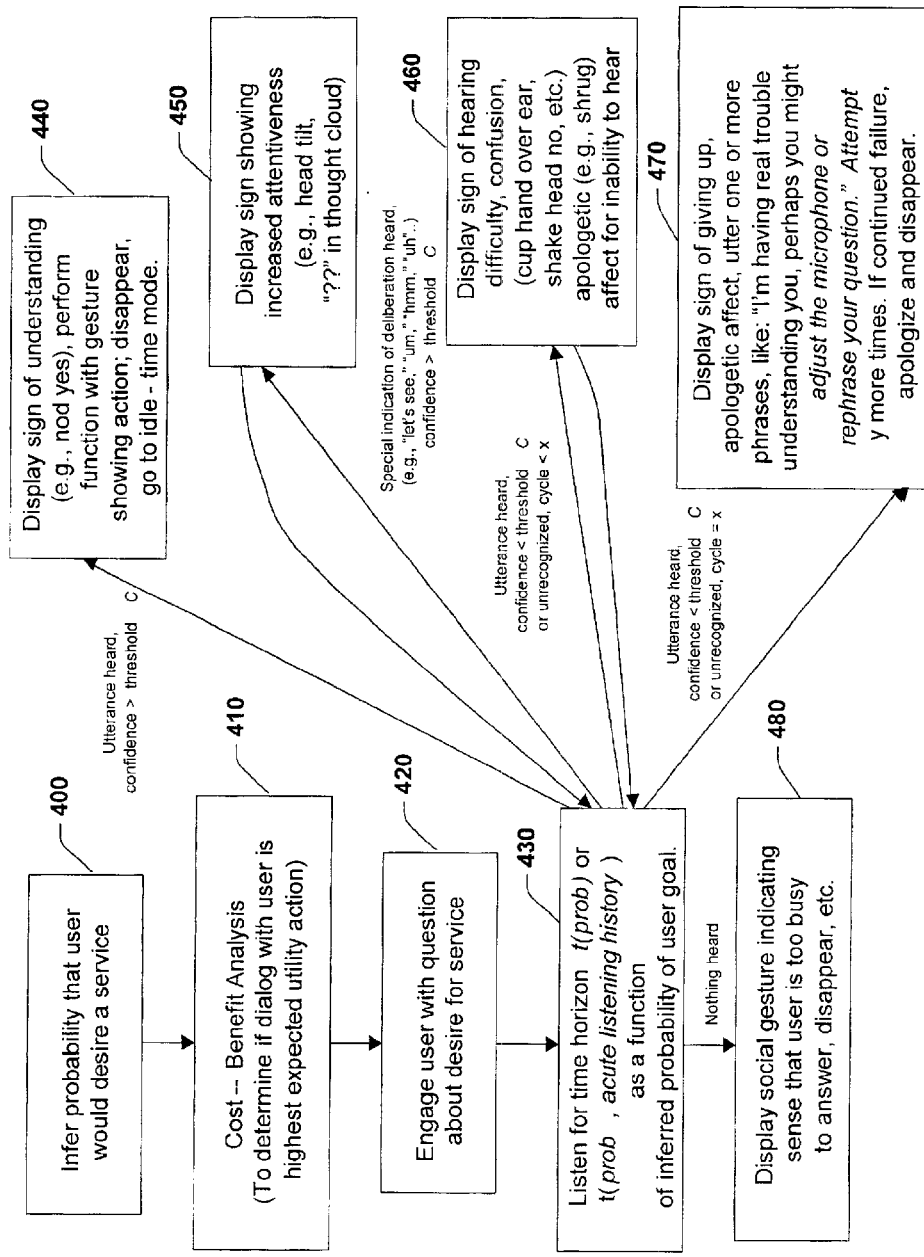
FIG. 10 is a flow diagram illustrating a methodology for communicative uncertainty in accordance with an aspect of the present invention.

FIG. 10 illustrates a methodology for performing a cost benefit analysis and decision-making given communicative uncertainty in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring to FIG. 10, and proceeding to 400, a probability is inferred from a user dialog relating to whether the user desires a service such as described above in relation to a command and control system. A 410, a cost benefit-analysis is performed to determine whether the dialog with the user is a highest expected utility action. At 420, the user is engaged with a question regarding the user's desire for service. At 430, a system such as a command and control system listens (e.g., input audio or other data (pause, gesture) to system) over a time horizon (t) to determine a probability as a function of inferred probability of the user's goal. As described above, Bayesian models can be constructed to infer the user's goal. If the utterance heard is resolved to a confidence greater than a threshold C at 430, the process proceeds to 440 and displays a sign of understanding the utterance (e.g., agent nod yes) and performs the system function or action. This can also include the disappearance of an animated agent after performing the function or action.

If there is some ambiguity in the utterance at 430, the process can proceed to 450 to get more information from the user. For example, if the user responds with phases such as "let's see", "um", "hmm", "uh", at 430 the process can display an animated agent at 450 depicting a head tilt or a "??" in a thought cloud. If the utterance heard at 430 is less than the confidence threshold at determined 430, the process can proceed to 460, wherein signs of hearing difficulty are displayed and thus encouraging the user to provide another utterance. If problems are still encountered while listening at 430, the process can proceed to 470 indicating an increased misunderstanding and/or further providing troubleshooting information to the user such as "adjust the microphone, or rephrase the question. If nothing is heard at 430, a social gesture can be displayed indicating that the user is currently too busy to respond and the animated agent can be removed from the display at 480.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An interactive system, comprising:

a component to assess reliability of a communication; and a component to infer a probability associated with one or more intentions of the communication; and a plurality of candidate utterances are defined for each intention; and the plurality of candidate utterances are analyzed according to a Bayesian network model, the model is determined over different instances of time to probabilistically infer a communicators intent.

2. The system of claim 1, further comprising:

a component for taking an action based upon the inferred probability to facilitate achieving a communicative intention.

3. The system of claim 2, wherein an immediate action is taken if the communicative intention is achieved.

4. The system of claim 2, wherein the action is at least one of a clarification action or a domain-level action.

5. The system of claim 2, wherein the actions are determined from a confidence threshold associated with an expected utility.

6. The system of claim 4, wherein the action is a domain level action; and the domain-level action includes at least one of engage, disengage, enable and disable.

7. The system of claim 4, wherein the clarification action includes at least one of asking user to repeat utterance, note a recognition of a users hesitation and try again, note a reception of a noise and inquire, getting the users intentions, apologizing for an interruption and forgoing the action, engage troubleshooting regarding the clarification action.

8. The system of claim 1, wherein the intent of the communication is associated with at least one of acknowledgement, negation, reflection, unrecognized response, and no response.

9. The system of claim 8, wherein the intent of the communications is influenced by the reliability of the communications.

10. The system of claim 9, wherein the reliability of communications are at least one of related to noise and background input levels associated with the communications.

11. The system of claim 1, further comprising an animated agent to interact with a communicator to determine the communicator's intent.

12. The system of claim 11, wherein the animated agent is at least one of a helper, a wizard, and a genie.

13. The system of claim 11, further comprising the animated agent provides services relating to synchronization of contacts, appoints, and tasks, associated with at least one of an e-mail, scheduling, calendaring, and planning service.

14. The system of claim 1, further comprising a development tool that is utilized for a plurality of command and control domains.

15. A method for interactive communications, comprising:

assessing reliability of a communication; and inferring probability associated with one or more intentions of the communication; and defining a plurality of candidate utterances for each intention; and analyzing the plurality of candidate utterances according to a Bayesian network model, the model is determined over different instances of time to probabilistically infer a communicators intent.

16. The method of claim 15, further comprising:

taking an action based upon the inferred probability to facilitate achieving a communicative intention.

17. The method of claim 16, wherein an immediate action is taken if the communicative intention is achieved.

18. The method of claim 16, wherein the action is at least one of a clarification action or a domain-level action.

19. A computer readable medium having instructions stored thereon for performing the acts of claim 11.

20. An interactive system, comprising:

a first component for analyzing sequential communications including speech, gestures and other modalities related to one or more underlying communicative intentions, the component defining a plurality of candidate utterances for each intention and analyzing the plurality of candidate utterances according to a Bayesian network model, the model is determined over different instances of time to probabilistically infer a communicators intent, and the component concurrently employing at least two of the communications in determining an action to facilitate achieving the intention; and a second component to perform the action if the underlying communicative intention is above a confidence threshold.

21. A method to determine communicative uncertainty, comprising:

inferring a probability that a user desires a service;

performing a cost-benefit analysis to determine whether a dialog with the user is above a predetermined expected utility; and engaging a user with a question about the desires of the service according to the expected utility.

22. The method of claim 21, further comprising listening over time to determine whether an utterance heard is greater than a confidence threshold.

23. The method of claim 22, further comprising displaying a sign of understanding and performing an action if the utterance heard is greater than the confidence threshold.

24. The method of claim 22, further comprising displaying a sign of misunderstanding if the utterance heard is below the confidence threshold.

25. The method of claim 22, further comprising offering troubleshooting information if the utterance heard is below the confidence threshold.

26. A system to determine communicative uncertainty, comprising:

means for inferring a probability that a user desires a service;

means for performing a cost-benefit analysis to determine whether a dialog with the user is above a predetermined expected utility;

means for engaging a user with a question about the desires of the service according to the expected utility.

27. The system of claim 26, further comprising means for listening over time to determine whether an utterance heard is greater than a confidence threshold.

* * * * *